E. J. YOUNG.
SHOCK ABSORBING MECHANISM.
APPLICATION FILED OCT. 27, 1908.
916,822.
Patented Mar. 30, 1909.
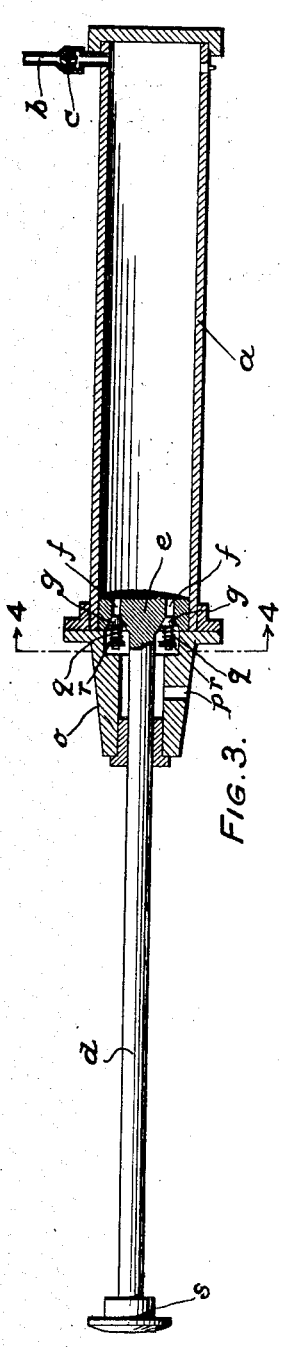
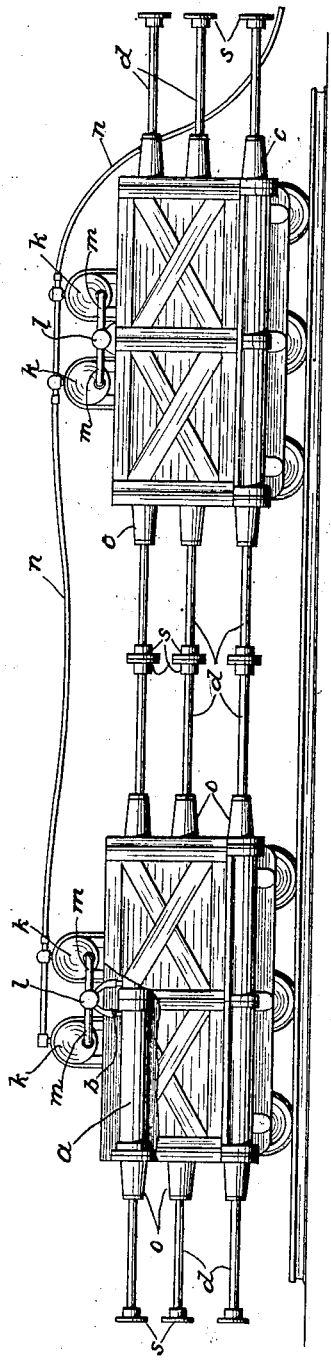
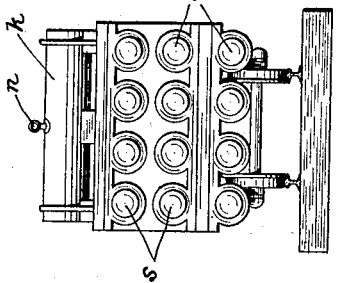
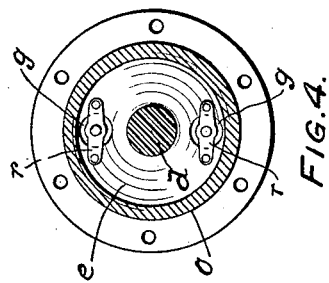
WITNESSES:
INVENTOR
Edgar John Young
BY
Harding & Harding
ATTORNEYS.

UNITED STATES PATENT OFFICE.

EDGAR JOHN YOUNG, OF BUENOS AYRES, ARGENTINA.

SHOCK-ABSORBING MECHANISM.

No. 916,822.  Specification of Letters Patent.  Patented March 30, 1909.

Application filed October 27, 1908. Serial No. 459,763.

*To all whom it may concern:*

Be it known that I, EDGAR JOHN YOUNG, a citizen of the United States, temporarily residing at Buenos Ayres, Argentina Republic, have invented a new and useful Improvement in Shock-Absorbing Mechanism, of which the following is a full, clear, and exact description, reference being had to the accompanying drawings, which form a part of this specification.

In Letters Patent of the United States, No. 874,150, issued to me December 17, 1907, I have described, illustrated and claimed a shock absorbing apparatus in which there is used a cylinder containing a liquid, the wall at one end of the cylinder adapted to be ruptured, and a piston having openings from one side to the other and provided with a cutting surface adapted to rupture or break the rupturable wall of the cylinder when the piston rod is moved under shock.

My present invention is an improvement upon such apparatus.

In my improved apparatus, speaking generally, I use a liquid supply under pressure, the liquid being led from said supply to a cylinder or plurality of cylinders, the passages from the source of liquid supply under pressure being provided with pressure valves, so that under normal conditions the liquid passes into and fills the cylinder or cylinders. Within each of these cylinders is a piston having openings from one side to the other. These openings are of such size as to provide a proper retarding force necessary to absorb the kinetic energy proportional to the weight of the mass, and thus absorb the shock. These openings are controlled by pressure valves of such strength as to remain closed under the normal pressure of the liquid in the cylinder. Each of the pistons is provided with a piston rod, having at its outer end a buffer. When this buffer strikes or is struck, the piston is moved inward, increasing the pressure of the fluid in the cylinder, which causes the valves controlling the passage or passages from the source of liquid supply under pressure to close. This movement of the piston also causes the pressure to accumulate sufficiently to open the valves controlling the passages from one side to the other of the piston, and liquid in the cylinder escapes, relieving the shock proportional to the size of the opening.

I will now describe the specific embodiment of my invention illustrated in the accompanying drawing, in which—

Figure 1 is a longitudinal elevation of a combination of two buffer cars provided with my improved shock absorbing mechanism. Fig. 2 is an end view of same. Fig. 3 is a view partially in section, showing my improved arrangement of the cylinder, piston, piston rod and appurtenant mechanism. Fig. 4 is an enlarged cross-section on the line 4—4 of Fig. 3.

$a$ are the cylinders. At one end of each of the cylinders is a passage or pipe $b$, leading to the source of pressure supply $l$. In each of these pipes $b$ is a pressure valve $c$. The cylinder $a$ has an extension $o$ provided with an outlet $p$. $d$ is the piston rod, $e$ the piston within the cylinder $a$, said piston having openings $f$ from one side to the other. These openings are controlled by valves $g$ acted upon by springs $q$, which springs are secured by the clips $r$.

The source of pressure supply $l$ is connected by pipes $m$ with the liquid reservoirs $k$, said liquid reservoirs $k$ being connected by a flexible pipe $n$ with a source of air pressure, which, if the device is being used in connection with railroads, may be taken from the engine.

The springs $q$ are of strength sufficient to hold the valves $g$ upon their seats against the action of the normal pressure in the cylinder $a$. The normal pressure in cylinder $a$, however, is sufficient to hold the piston $e$ at one end of the cylinder and against the head at that end. At the outer end of the piston rod is the buffer $s$. When the buffer $s$ strikes an obstruction or is struck by a moving mass, the piston rod $d$ is moved inward. This increases the pressure of the liquid in the cylinder $a$, causing the valve $c$ to close and causing the valves $g$ to open. The further movement of the piston causes the liquid in the cylinder to pass through the openings $f$, through which the liquid escapes through the outlet $p$.

By properly designing the length of the cylinder and the size of the openings $f$, a proper absorption of the kinetic energy, without shock to the moving object, may be obtained.

In practice, the reservoirs $k$ and $l$, the cylinder, its connection, the piston, piston rod and its appurtenant mechanism, all have a common support. In practice, also, I use a plurality of cylinders and pistons.

If my shock absorbing mechanism is to be used in a moving train, the mechanism is mounted upon wheels forming cars, as shown in Figs. 1 and 2. These cars may be interposed between the engine and baggage car. A set of cylinders and a set of pistons and appurtenant mechanism could also advantageously be placed in the front of the engine, being either mounted directly upon the engine or upon a separate car, and in like manner with respect to the rear end of the train. Preferably, I also use a plurality of cars coacting with each other, as shown in Fig. 1.

As may readily be seen, after the impact has been relieved, the pressure in the cylinder *a* will cause the piston to return to its initial position. When the pressure in the cylinder *a* has returned to its normal position, the valve *c* will open and the valves *g* close, enabling the cylinder to again become filled with liquid under the desired pressure.

Having now fully described my invention, what I claim and desire to protect by Letters Patent is:—

1. In a shock absorber, in combination, a cylinder, a liquid inlet to said cylinder, a piston in said cylinder having openings from one side to the other, pressure valves controlling said openings, a piston rod for said piston, the inlet opening into said cylinder on one side of said piston, said pressure valves maintaining said openings from one side to the other of the pistons closed against the pressure of the inlet liquid.

2. In a shock absorber, in combination, a cylinder, a liquid inlet to said cylinder, a piston in said cylinder having openings from one side to the other, pressure valves controlling said openings, a piston rod for said piston, the inlet opening into said cylinder on one side of said piston, said pressure valve maintaining said openings from one side to the other of the piston closed against the pressure of the inlet liquid, and an outlet from said cylinder on the side of the piston opposite to that of the inlet.

3. In a shock absorber, in combination, a source of liquid supply, a cylinder, a passage from said source of liquid supply to said cylinder, a piston in said cylinder having openings from one side to the other, pressure valves controlling said openings and a piston rod for said piston, the passage from the source of supply opening into said cylinder on one side of said piston, said pressure valves maintaining said openings from one side to the other of the piston closed against the pressure of the incoming liquid.

4. In a shock absorber, in combination, a source of liquid supply, a cylinder, a passage from said source of liquid supply to said cylinder, a piston in said cylinder having openings from one side to the other, pressure valves controlling said openings and a piston rod for said piston, the passage from the source of supply opening into said cylinder on one side of said piston, said pressure valves maintaining said openings from one side to the other of the piston closed against the pressure of the incoming liquid, and an outlet from said cylinder on the side of the piston opposite to that of the inlet.

5. In a shock absorber, in combination, a source of liquid supply, a cylinder, a passage from said source of liquid supply to said cylinder, a valve in said passage normally opening and closing by back pressure from the cylinder, a piston in said cylinder having openings from one side to the other, pressure valves controlling said openings and a piston rod for said piston, the passage from the source of supply opening into the cylinder on one side of the piston, said pressure valves maintaining the openings in the piston closed against the pressure of the incoming liquid.

6. In a shock absorber, in combination, a source of liquid supply, a cylinder, a passage from said source of liquid supply to said cylinder, a valve in said passage normally opening and closing by back pressure from the cylinder, a piston in said cylinder having openings from one side to the other, pressure valves controlling said openings and a piston rod for said piston, the passage from the source of supply opening into the cylinder on one side of the piston, said pressure valves maintaining the openings in the piston closed against the pressure of the incoming liquid, and an outlet from said cylinder on the side of the piston opposite to that of the inlet.

7. In a shock absorber, in combination, a source of liquid supply, a plurality of cylinders having a support common to all, passages from the source of liquid supply to said cylinders, a piston in each cylinder, each piston having openings from one side to the other, pressure valves controlling said openings and a piston rod for each piston, said passages from the source of liquid supply opening into the respective cylinders on one side of the pistons in said cylinders, said pressure valves maintaining the openings from one side to the other of the pistons closed against the action of the incoming liquid.

8. In a shock absorber, in combination, a source of liquid supply, a plurality of cylinders having a support common to all, passages from the source of liquid supply to said cylinders, a piston in each cylinder, each piston having openings from one side to the other, pressure valves controlling said openings and a piston rod for each piston, said passages from the source of liquid supply opening into the respective cylinders on one side of the pistons in said cylinders, said pressure valves maintaining the openings from one side to the other of the pistons closed against the action of the incoming liquid, and an outlet from said cylinder on the side of the piston opposite to that of the inlet.

9. In a shock absorber, in combination, a source of liquid supply, a plurality of cylinders having a support common to all, passages from the source of liquid supply to said cylinders, a valve in each passage normally open and closing by back pressure from the cylinder, a piston in each cylinder, each piston having openings from one side to the other, pressure valves controlling said openings and a piston rod for each piston, said passages from the source of liquid supply opening into the respective cylinders on one side of the pistons in said cylinders, said pressure valves maintaining the openings from one side to the other of the pistons closed against the action of the incoming liquid.

10. In a shock absorber, in combination, a source of liquid supply, a plurality of cylinders having a support common to all, passages from the source of liquid supply to said cylinders, a valve in each passage normally open and closing by back pressure from the cylinder, a piston in each cylinder, each piston having openings from one side to the other, pressure valves controlling said openings and a piston rod for each piston, said passages from the source of liquid supply opening into the respective cylinders on one side of the pistons in said cylinders, said pressure valves maintaining the openings from one side to the other of the pistons closed against the action of the incoming liquid, and an outlet from said cylinder on the side of the piston opposite to that of the inlet.

In testimony of which invention, I have hereunto set my hand, at Buenos Ayres, on this 23rd day of September, 1908.

EDGAR JOHN YOUNG.

Witnesses:
    JNO. FINNEMORE,
    C. RAGAN.